(12) United States Patent
Mueller (10) Patent No.: US 12,366,297 B2
(45) Date of Patent: Jul. 22, 2025

(54) CONTROL VALVE (71) Applicant: Robert Bosch GmbH, Stuttgart (DE)

(72) Inventor: Mareike Mueller, Staig (DE)

(73) Assignee: Robert Bosch GmbH, Stuttgart (DE)

( * ) Notice: Subject to any disclaimer, the term of this patent is extended or adjusted under 35 U.S.C. 154(b) by 224 days.

(21) Appl. No.: 18/342,763

(22) Filed: Jun. 28, 2023

(65) Prior Publication Data

US 2024/0003438 A1 Jan. 4, 2024

(30) Foreign Application Priority Data

Jul. 4, 2022 (DE) ...................... 10 2022 206 789.4

(51) Int. Cl.
*F16K 11/07* (2006.01)
*F04B 49/22* (2006.01)
*F16K 31/52* (2006.01)

(52) U.S. Cl.
CPC .......... *F16K 11/0708* (2013.01); *F04B 49/22* (2013.01); *F16K 31/523* (2013.01)

(58) Field of Classification Search
CPC ..... F16K 11/0708; F16K 31/523; F04B 49/22
See application file for complete search history.

(56) References Cited

U.S. PATENT DOCUMENTS 7,131,630 B2 * 11/2006 Adler .................. F15B 13/0402
335/278
2014/0112812 A1 * 4/2014 Takemi ................. F04B 39/128
417/571

FOREIGN PATENT DOCUMENTS

EP 1 573 212 B1 5/2006

* cited by examiner

*Primary Examiner* — P. Macade Nichols
(74) *Attorney, Agent, or Firm* — Maginot, Moore & Beck LLP

(57) ABSTRACT

A stroke-volume adjustable axial piston pump control valve includes a valve slide arranged in an axially displaceable manner in a housing of the control valve to optionally connect a feed pressure channel, which can be connected to a tank and is arranged and/or formed in the housing, to a control pressure channel, which can be connected to a control pressure chamber of the pump and is arranged and/or formed in the housing. The control valve and/or adjoining components are protected from contamination by a cap filter arranged substantially perpendicularly to a main outer surface of the housing formed substantially in one plane in a blind bore of the housing, and the control pressure channel opens into the main outer surface of the housing at an angle such that the control pressure channel penetrates the blind bore in a mouth region of the control pressure channel adjoining the main outer surface.

11 Claims, 5 Drawing Sheets

CONTROL VALVE

This application claims priority under 35 U.S.C. § 119 to application no. DE 10 2022 206 789.4, filed on Jul. 4, 2022 in Germany, the disclosure of which is incorporated herein by reference in its entirety.

The present disclosure relates to a control valve for a or of a pump, in particular a stroke-volume adjustable axial piston pump, in particular having a valve slide which is arranged in an axially displaceable manner in a housing of the control valve in order to optionally connect at least one feed pressure channel, which is provided for a tank connection and arranged in the housing, to at least one control pressure channel, which is provided and/or designed for a connection to the control pressure chamber of the pump and arranged in the housing.

BACKGROUND

EP 1 573 212 B1 discloses such a control valve for regulating a pivot angle of a stroke-volume adjustable axial piston pump. For this purpose, a piston of a control cylinder of the axial piston pump can be subjected to a control pressure by means of two control pressure chambers. The control pressures acting in the first and second control pressure chambers act on oppositely oriented piston surfaces of the piston, on which a resulting force acts in the event of a pressure difference. The control valve is provided for adjusting this pressure difference. The control valve has a valve slide which is arranged in a bore of a housing of the control valve in an axially displaceable manner. Furthermore, a first feed pressure channel and a second feed pressure channel are introduced into the housing. The first and the second feed pressure channels are connected to a feed pressure line, which can be connected, for example, to an auxiliary pressure source. To adjust the control pressures in the first control pressure chamber and the second control pressure chamber, the feed pressure line or the first or the second feed pressure channel can be connected to a first or a second control pressure channel. The first control pressure channel is connected to the first control pressure chamber and the second control pressure channel is connected to the second control pressure chamber. In order to adjust the valve slide, a control magnet is provided which is arranged on the housing of the control valve. Via the axial position of the valve slide, which can be adjusted by means of the control magnet, it is thus also possible to select whether a fluid is transmitted from the feed pressure line to the first or the second control pressure channel. It is also conceivable for the fluid to be transmitted from the feed pressure line to the first and the second control pressure channels, wherein a flow ratio between the first and the second control pressure channels can then be adjusted by means of the axial position of the valve slide. Furthermore, the fluid can selectively drain from the control pressure chambers into a tank volume via the valve slide if this is necessary. The valve slide is movement-coupled to the movable piston via a lever mechanism and a spring in such a way that a force, which is dependent on the position of the piston, acts on the valve slide in its movement direction. The lever mechanism and the spring are at least partially accommodated in a common cavity of the housing of the control valve, which can be connected to a pressure fluid sink or which is designed as a pressure fluid sink. A central region of the valve slide passes through the cavity. The valve slide is movement-coupled to the lever mechanism in the central region of the valve slide.

This results in the problem that dirt particles contained in the fluid can flow through the control pressure channels between the valve slide and, for example, the control pressure chambers of the pump and back and forth. As a result of the dirt particles, increased wear occurs on the valve slide and under certain circumstances also a control magnet of the valve slide and/or on the pump. This leads to a poor ability to control or regulate the axial position of the valve slide and consequently also to a poor ability to control or regulate the displacement volume of the axial piston machine, which may be connected to the control valve, or other components connected to the control valve. When dirt enters the control magnet, the hysteresis of this control magnet is also increased, and pronounced stick-slip effects occur on the control magnet, which has a corresponding effect on the movement of the valve slide.

SUMMARY

An object of the present disclosure is to provide a control valve which reduces or eliminates the problems of the prior art. In particular, the control valve and/or adjoining components such as the pump should be effectively protected against contamination.

This object is achieved by the control valve according to the disclosure.

Further advantageous embodiments are the subject matter of the disclosure.

More precisely, the object is achieved by a cap filter which is arranged substantially perpendicularly to a main outer surface of the housing formed substantially in one plane in a blind bore of the housing, and the control pressure channel opens into the main outer surface of the housing at an angle such that the control pressure channel penetrates the blind bore in a mouth region of the control pressure channel adjoining the main outer surface.

The valve slide is protected from contamination by means of the cap filter. Any dirt particles which are produced or transmitted by a component connected to the control valve are retained by the cap filter before they can reach the valve slide. Thus, the axial position of the valve slide can be adjusted particularly precisely since the adjustment of the valve slide is not disturbed by such dirt particles. Thus, the control pressures of a fluid, which are transmitted by means of the control valve to the connected component such as a pump, can also be adjusted particularly precisely. The cap filter is particularly easy to mount and can be sealed accordingly since the cap filter is arranged substantially perpendicularly to a main outer surface formed substantially in one plane. The main outer surface is used to form a seal between the housing of the control valve and a housing of the connected component. Due to the design of the main outer surface in substantially one plane, the seal is simplified, wherein it is possible to deviate from the design of the main outer surface in one plane as long as a sufficiently good seal is ensured. The arrangement of the cap filter substantially perpendicularly to a main outer surface means that this perpendicular arrangement can be deviated from by a few degrees, in particular a maximum of 5°. Usually, the deviations from the perpendicular arrangement are within the region of the manufacturing tolerances. Due to this perpendicular arrangement, standardized cap filters can be used, which are advantageous. Due to the penetration of the control pressure channel through the blind bore in a mouth region of the control pressure channel adjoining the main outer surface, the control valve is furthermore particularly compact, i.e., can be implemented in a particularly small space since an installation space formed by means of the housing is utilized particularly efficiently. In particular, a housing region formed centrally between the valve slide and the main outer surface is not penetrated by the cap filter so that this central housing region can be used otherwise. It could also be said that, due to the oblique control pressure channel, the cap filter can be arranged outside of center or can be flexibly positioned in the housing. The control pressure channel and the blind bore are easy to produce by drilling so that the housing can be produced quickly and economically. In particular, elaborate casting or sintering processes can be avoided.

Preferably, an intermediate ring is inserted into the blind bore in the mouth region of the control pressure channel in order to support the cap filter mechanically relative to the housing on the inner circumference of the intermediate ring, preferably with an anti-rotation device.

Due to the control pressure channel penetrating the blind bore in the mouth region, the support of the cap filter and the sealing of the blind bore and the control pressure channel to the environment would be disturbed without the intermediate ring. In other words, the intermediate ring enables a complex geometry in the mouth region, which, however, is simple to produce with particularly simple manufacturing methods such as drilling and assembly. Due to its rotationally symmetrical shape, the intermediate ring itself is also easy to produce.

Further preferably, an annular receiving groove for receiving a sealing ring, in particular an O-ring or an R-ring, is formed by means of a housing groove which is introduced into the main outer surface and an intermediate ring groove which is introduced into the intermediate ring in the region of an end face of the intermediate ring in order to be able to seal the blind bore and/or the control pressure channel in the region of the main outer surface with respect to an environment.

Without the intermediate ring, the control pressure channel would penetrate the receiving groove, which would disturb the seal. This is also the case, in particular, since the sealing ring is arranged only at a small radial distance from the cap filter in order to form the smallest possible sealing surfaces. In other words, a required chambering of the sealing ring is ensured by means of the intermediate ring.

According to a particularly preferred embodiment of the control valve, the sealing ring rests sealingly both on a radially inner side wall of the intermediate ring groove as well as a bottom surface of the intermediate ring groove preferably oriented in parallel with the main outer surface of the housing.

A particularly good seal is thus made possible. A gap between the intermediate ring and the housing in the region of the receiving groove is covered by the sealing ring so that no fluid such as oil can pass through. A bottom surface of the entire receiving groove is formed by the bottom surface of the intermediate ring groove and a bottom surface of the housing groove.

It can be advantageous if the intermediate ring is connected to the housing under pretensioning, in particular by means of a press connection.

A defined position of the intermediate ring relative to the housing can thus be achieved. In particular, during the assembly of the intermediate ring, the bottom surface of the intermediate ring groove is oriented to the bottom surface of the housing groove so that a planar transition is achieved. The orientation above is facilitated by the fact that the housing does not have a mounting stop for the installation depth of the intermediate ring.

The intermediate ring is advantageously arranged countersunk in the blind bore such that a distance is formed between the main outer surface of the housing and the end face of the intermediate ring facing the main outer surface.

The orientation of the intermediate ring with the housing is thus not disturbed by the attachment of the control valve to a further component such as the pump.

According to a further preferred embodiment of the control valve, a receiving recess of the blind bore adjoining the main outer surface for receiving the intermediate ring has a greater axial length than the intermediate ring itself.

The aforementioned avoidance of a mounting stop for the intermediate ring can be produced in a simple manner by means of the receiving recess, which is preferably produced by drilling.

Further preferably, the housing has a lever recess in which a lever mechanism which can be movement-coupled to the valve slide can be arranged. A feedback of a control movement of a piston of a control cylinder of the pump to the valve slide is made possible by means of the lever mechanism.

The functional scope of the control valve can thus be expanded.

According to a further embodiment of the control valve, the lever recess penetrates the main outer surface of the housing.

An annular lever recess groove for receiving a further sealing ring is advantageously introduced into the main outer surface of the housing, enclosing the lever recess, in order to be able to seal the lever recess relative to the environment, in particular by means of a pump housing of the pump and the further sealing ring.

To further improve the compactness of the control valve, a plane arranged perpendicularly to the valve slide intersects both the receiving groove and the lever recess and/or the lever recess groove.

In other words, the receiving groove, the lever recess and/or the lever recess groove can be arranged particularly close to one another.

In summary, such a control valve is suitable for various applications, such as, for example, for adjusting the piston of the control cylinder of the stroke-volume adjustable axial piston pump. However, control cylinders of other pumps can also be actuated by means of the control valve. Furthermore, the control valve could also be used for other preferably hydraulic components such as, for example, actuators or hydraulic cylinders.

BRIEF DESCRIPTION OF THE DRAWINGS

In the following, preferred embodiments are depicted in more detail with reference to the accompanying figures.

DETAILED DESCRIPTION

Figure 1:
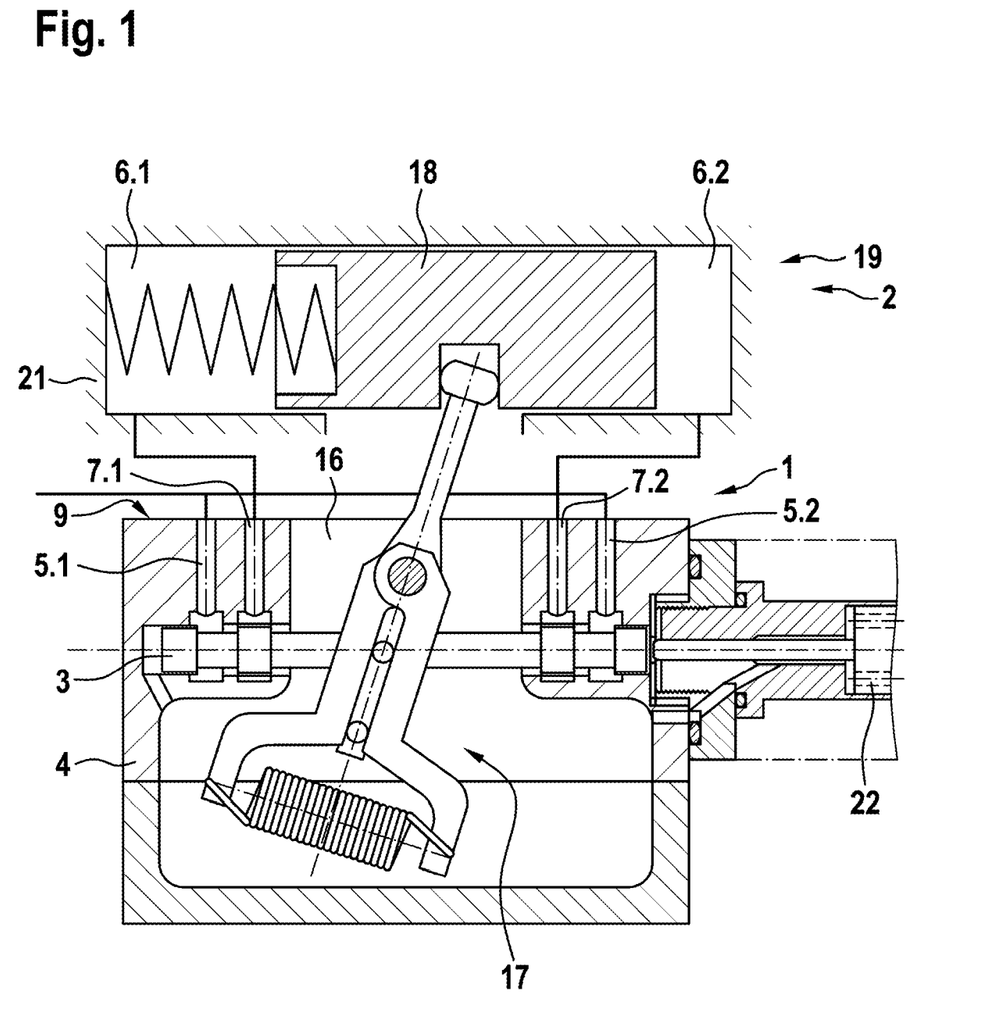
FIG. 1 shows a schematic view of a control valve having a control cylinder connected thereto of a pump according to the prior art in a sectional view.

FIG. 1 shows a control valve 1 according to the prior art in order to depict the basic functions which are also implemented by the control valve 1 according to the disclosure according to FIG. 2 to FIG. 5. In all figures, the same reference numerals are used for the same components. The control valve 1 for a or of a pump 2, in particular a stroke-volume adjustable axial piston pump, has, inter alia, a valve slide 3 which is arranged in an axially displaceable manner in a housing 4 of the control valve 1 in order to optionally connect at least one feed pressure channel 5.1, 5.2, which can be connected to a tank and is arranged and/or formed in the housing 4, to at least one control pressure channel 7.1, 7.2, which can be connected to a control pressure chamber 6.1, 6.2 of the pump 2 and is arranged and/or formed in the housing 4.

Figure 2:
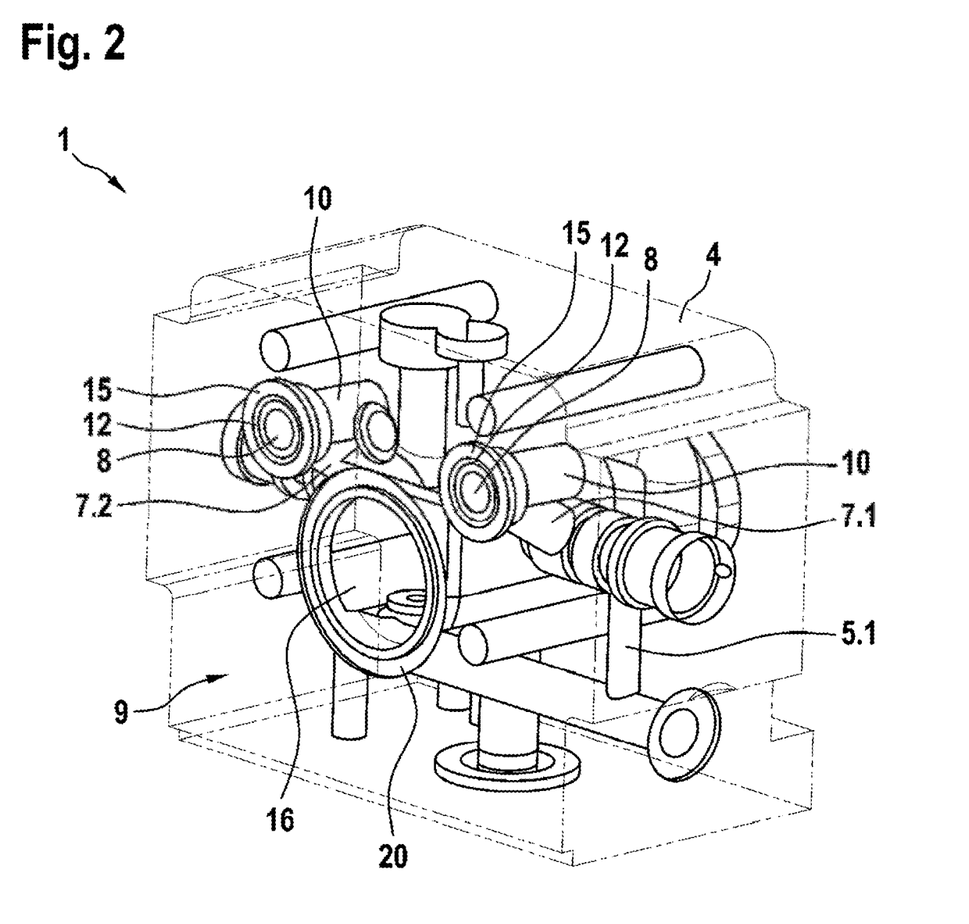
FIG. 2 shows a schematic view of a control valve according to a preferred embodiment of the present application in a three-dimensional view.
Figure 3:
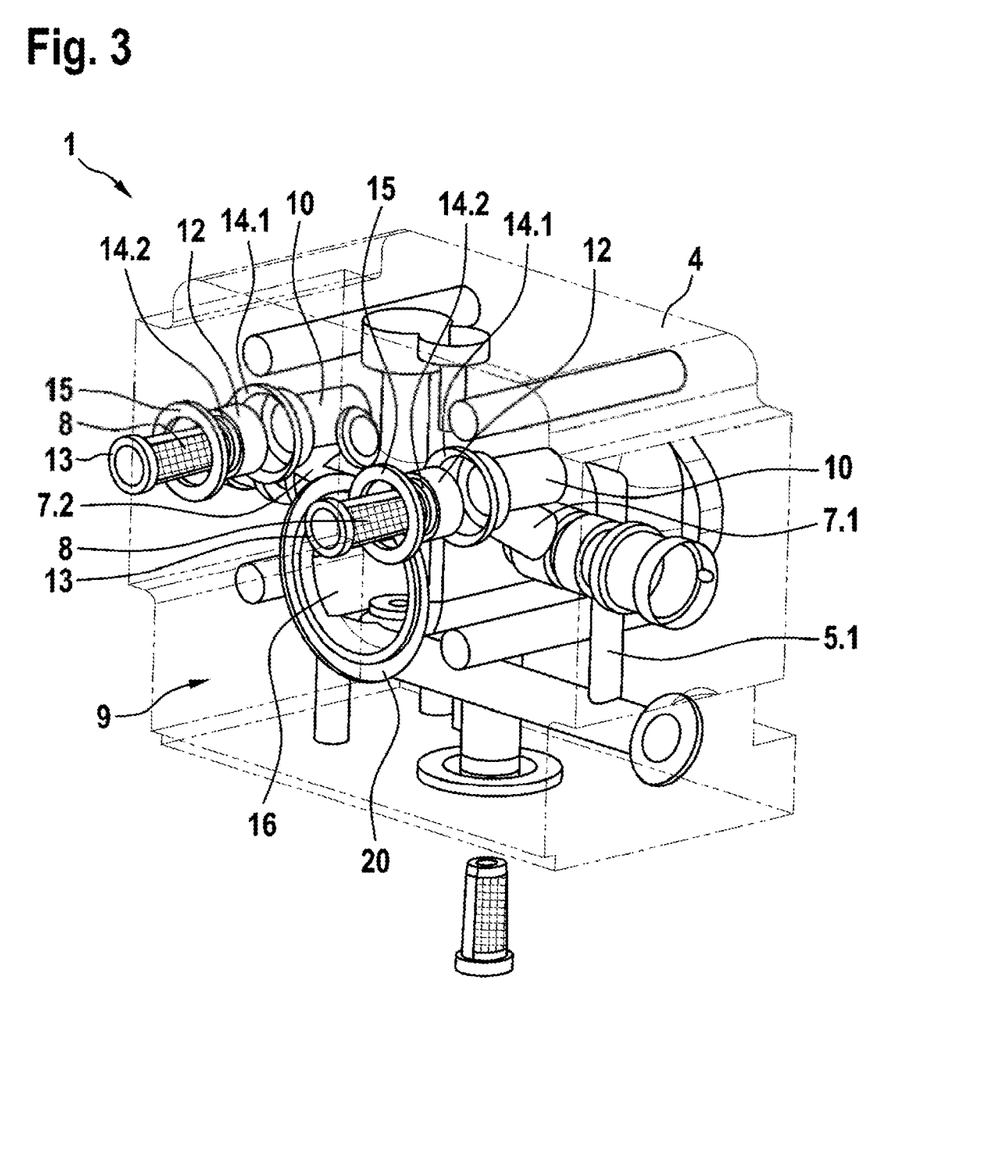
FIG. 3 shows a schematic view of the control valve according to the preferred embodiment of the present application in a three-dimensional exploded view.

FIG. 1, FIG. 2 and FIG. 3 each show a first control pressure channel 7.1 and a second control pressure channel 7.2. A first feed pressure channel 5.1 can be optionally connected to the first control pressure channel 7.1 and thus to a first control pressure chamber 6.1. A second feed pressure channel 5.2 can be optionally connected to the second control pressure channel 7.2 and thus to a second control pressure chamber 6.2. The control pressure chambers 6.1, 6.2 are only shown in FIG. 1, but can also be connected to the control valve 1 according to FIG. 2 to FIG. 5. In FIG. 2 and FIG. 3, the second feed pressure channel 5.2 is covered in each case by further components of the control valve 1. According to the situation shown in FIG. 1, the valve slide 3 is in its right end position so that fluid can be supplied to the first control pressure chamber 6.1 via the first feed pressure channel 5.1 via the first control pressure channel 7.1. Fluid can drain out of the second control pressure chamber 6.2 via the second control pressure channel 7.2. The valve slide 3 can be moved back and forth between the right end position and a left end position by means of a control magnet 22. For this purpose, the control magnet 22 is correspondingly electrically actuated. If the valve slide 3 is in its left end position by actuating the control magnet 22, fluid can be supplied to the second control pressure chamber 6.2 via the second feed pressure channel 5.2 via the second control pressure channel 7.2. Fluid can then drain out of the first control pressure chamber 6.1 via the first control pressure channel 7.1. Adjusting intermediate positions of the valve slide 3 is conceivable.

According to the control valve 1 according to the disclosure from FIG. 2 to FIG. 5, a cap filter 8 is arranged substantially perpendicularly to a main outer surface 9 of the housing 4 formed substantially in one plane in a blind bore 10 of the housing 4. The control pressure channel 7.1, 7.2 opens into the main outer surface 9 of the housing 4 at an angle α such that the control pressure channel 7.1, 7.2 penetrates the blind bore 10 in a mouth region 11 of the control pressure channel 7.1, 7.2 adjoining the main outer surface 9.

FIG. 2 and FIG. 3 each show two cap filters 8 inserted according to the disclosure, which are designed identically and are therefore provided with the same reference signs. In FIG. 2, the cap filter 8 is shown mounted in the housing 4, whereas in FIG. 3 an exploded representation illustrates the components adjoining the cap filter 8 and an assembly process in the direction of the arrows shown adjacent to the cap filters 8. FIG. 2 and FIG. 3 show a third cap filter inserted from below, but which is not inserted according to the disclosure.

An intermediate ring 12 is inserted into the blind bore 10 in the mouth region 11 of the control pressure channel 7.1, 7.2 in order to support the cap filter 8 mechanically relative to the housing 4, preferably with an anti-rotation device 13, on the inner circumference of the intermediate ring 12.

Figure 4:
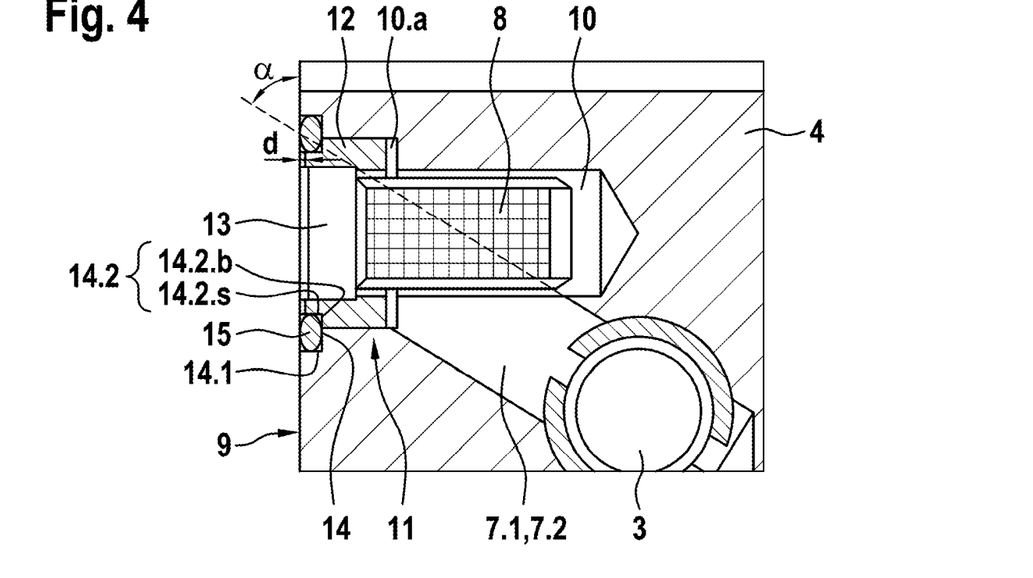
FIG. 4 schematically shows a section of the control valve according to the preferred embodiment of the present application according to FIG. 2 in a section through a control pressure channel and an associated blind bore.
Figure 5:
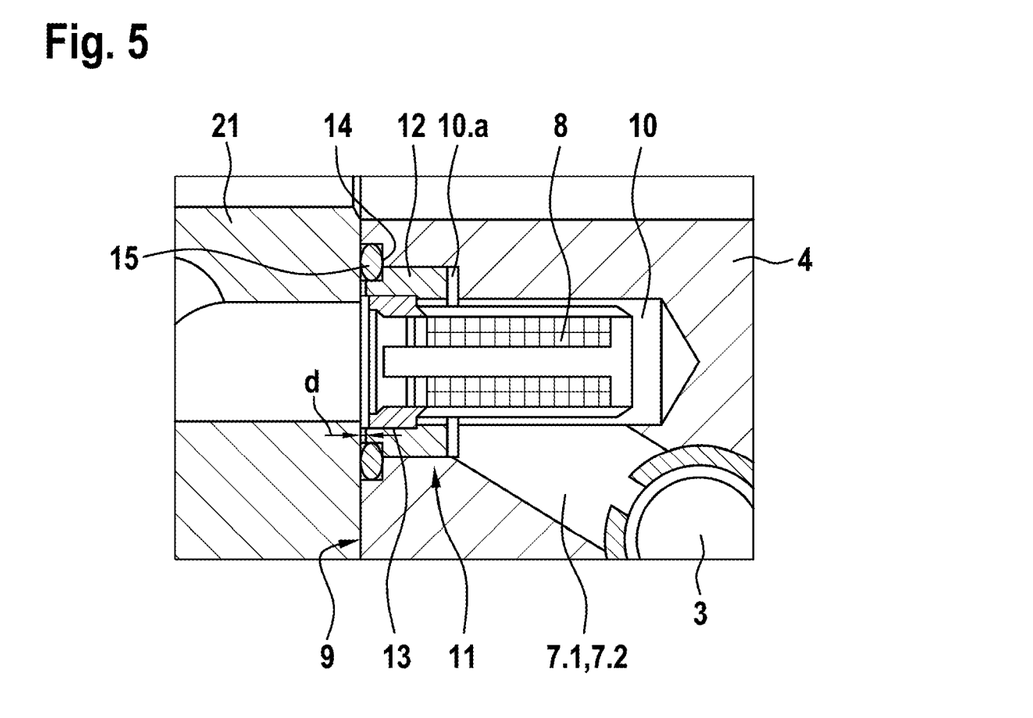
FIG. 5 schematically shows a section of the control valve according to the preferred embodiment of the present application according to FIG. 2 in a section through a control pressure channel, an associated blind bore and the cap filter arranged in the blind bore with an adjoining pump housing.

The position of the intermediate ring 12 can be seen in particular from FIG. 4 and FIG. 5. In FIG. 4, the cap filter 8 itself is not shown in section like the rest. In FIG. 5, the cap filter 8 is also shown in section. The representation from FIG. 4 and FIG. 5 is valid for both control pressure channels 7.1, 7.2. The cap filter 8 has a fabric which is held on a frame of the cap filter 8. The cap filter 8 is mounted in such a way that fluid can flow through the cap filter 8 only through the fabric in order to filter out from the fluid any dirt particles present in the fluid by means of the fabric. By means of a corresponding choice of the material of the anti-rotation device 13, a high static friction between the cap filter 8 and the intermediate ring 12 can be achieved so that in particular a rotation of the cap filter 8 in the intermediate ring 12, in particular due to fluid forces acting on the cap filter 8 during operation, is avoided. The intermediate ring 12 can have a mounting stop on its inner circumference for axial orientation of the cap filter 8.

An annular receiving groove 14 for receiving a sealing ring 15, in particular an O-ring or an R-ring, is formed by means of a housing groove 14.1 which is introduced into the main outer surface 9 and an intermediate ring groove 14.2 which is introduced into the intermediate ring 12 in the region of an end face of the intermediate ring 12 and faces the housing groove 14.1 in order to be able to seal the blind bore 10 and/or the control pressure channel 7.1, 7.2 in the region of the main outer surface 9 with respect to an environment. An O-ring has a round cross-section and an R-ring a substantially rectangular cross-section. The substantially rectangular cross-section can in particular be deviated from by having rounded corners.

This seal is clear in particular from FIG. 5 since a pump housing 21 arranged adjoining the sealing ring 15 is also shown here. By means of the sealing ring 15, it is thus ensured that, at normal pressures, no fluid can escape, for example coming from the cap filter 8, through a sealing gap formed between the housing 4 and the pump housing 21. For this purpose, the sealing ring rests sealingly on the pump housing 21. Instead of a pump housing 21, a housing of a different type of component connected to the control valve 1 could also be provided.

The sealing ring 15 rests sealingly both on a radially inner side wall 14.2.$s$ of the intermediate ring groove 14.2 and a bottom surface 14.2.$b$ of the intermediate ring groove 14.2 preferably oriented in parallel with the main outer surface 9 of the housing 4.

Figure 6:
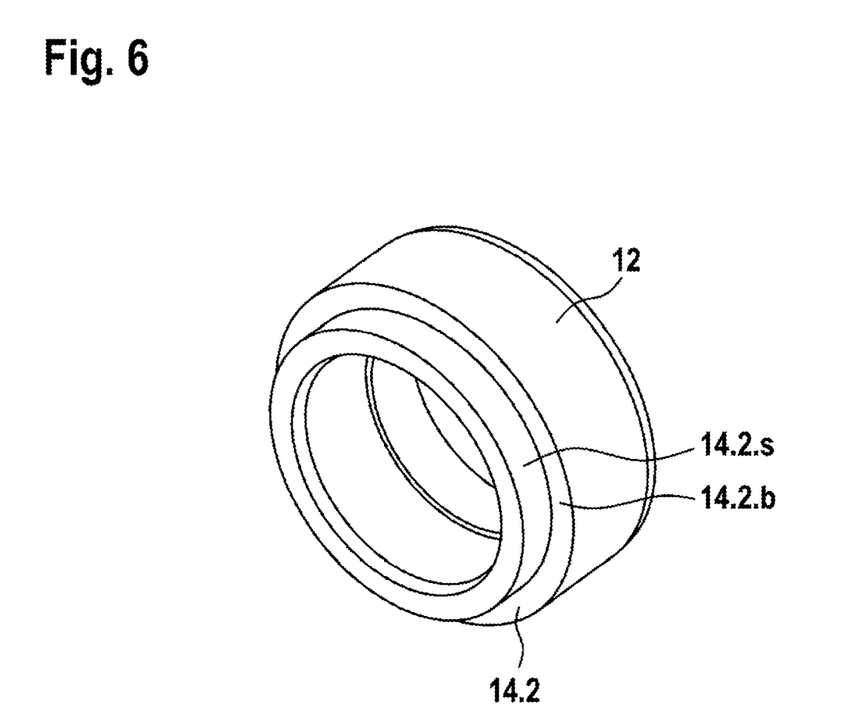
FIG. 6 shows a schematic view of an intermediate ring of the control valve according to the preferred embodiment of the present application in a three-dimensional view.

It is thus ensured that, at normal pressures, no fluid can flow between the sealing ring 15 and the intermediate ring 12. The radially inner side wall 14.2.$s$ and the bottom surface 14.2.$b$ of the intermediate ring groove 14.2 can be seen in particular from the separate representation of the intermediate ring 12 from FIG. 6.

The intermediate ring 12 is connected to the housing 4 under pretensioning, in particular by means of a press connection.

Other connections such as a screw connection with a corresponding seal between the intermediate ring 12 and the housing 4 are conceivable.

The intermediate ring 12 is arranged countersunk in the blind bore 10 such that a distance d is formed between the main outer surface 9 of the housing 4 and the end face of the intermediate ring 12 facing the main outer surface 9.

An axial length of the radially inner side wall 14.2.s is in this case shorter than an axial length of a radially outer side wall of the housing groove 14.1. The bottom surface 14.2.b is oriented aligned with a bottom surface of the housing groove 14.1.

A receiving recess 10.a of the blind bore 10 adjoining the main outer surface 9 has a greater axial length for receiving the intermediate ring 12 than the intermediate ring 12 itself so that the aligned orientation of the bottom surfaces is facilitated during the assembly of the intermediate ring 12.

The receiving recess 10.a of the blind bore 10 also has a larger diameter than the adjoining part of the blind bore 10. A small gap is thus formed between an end face of the intermediate ring 12 facing away from the sealing ring 15 and the housing 4. The intermediate ring 12 and the receiving recess 10.a are preferably dimensioned such that the control pressure channel 7.1, 7.2 intersects the receiving recess 10.a for the intermediate ring 12 if need be where the intermediate ring 12 no longer rests. A small section between the receiving recess 10.a and the control pressure channel 7.1, 7.2 could thus be present.

The housing 4 has a lever recess 16 in which a lever mechanism 17 which can be movement-coupled to the valve slide 3 can be arranged. A feedback of a control movement of a piston 18 of a control cylinder 19 of the pump 2 to the valve slide 3 is made possible by means of the lever mechanism 17.

The lever mechanism 17 is shown in particular in FIG. 1. For a more precise functional description of the lever mechanism 17, reference may be made at this point to EP 1 573 212 B1.

The lever recess 16 penetrates the main outer surface 9 of the housing 4.

An annular lever recess groove 20 for receiving a further sealing ring is introduced, enclosing the lever recess 16, into the main outer surface 9 of the housing 4 in order to be able to seal the lever recess 16 relative to the environment, in particular by means of the pump housing 21 of the pump 2 and the further sealing ring. This further sealing ring is not shown in the figures for the sake of clarity.

A plane arranged perpendicularly to the valve slide 3 intersects both the receiving groove 14 and the lever recess 16 and/or the lever recess groove 20.

It would therefore not be possible to orient the control pressure channels 7.1, 7.2 perpendicularly to the main outer surface 9 of the housing 4, to dispense with the blind bores 10, or to arrange the cap filter 8 directly in the control pressure channels 7.1, 7.2. Sealing the control pressure channels 7.1, 7.2 would then not be possible because of the lever recess 16 and/or the lever recess groove 20. The main outer surface 9 would then offer no space for forming a receiving groove surrounding the control pressure channels 7.1, 7.2 for each sealing ring.

LIST OF REFERENCE SIGNS

1 Control valve
2 Pump
3 Valve slide
4 Housing
5.1 First feed pressure channel
5.2 Second feed pressure channel
6.1 First control pressure chamber
6.2 Second control pressure chamber
7.1 First control pressure channel
7.2 Second control pressure channel
8 Cap filter
9 Main outer surface of the housing 4
10 Blind bore of the housing 4
10.a Receiving recess of the blind bore 10
11 Mouth region
12 Intermediate ring
13 Anti-rotation device
14 Receiving groove
14.1 Housing groove
14.2 Intermediate ring groove
14.2.s Radially inner side wall of the intermediate ring groove 14.2
14.2.b Bottom surface of the intermediate ring groove 14.2
15 Sealing ring
16 Lever recess
17 Lever mechanism
18 Piston
19 Control cylinder
20 Lever recess groove
21 Pump housing
22 Control magnet
α Angle
d Distance

What is claimed is:

1. A control valve for a stroke-volume adjustable axial piston pump, comprising:
    a valve slide arranged in an axially displaceable manner in a housing of the control valve and configured to optionally connect at least one feed pressure channel, which is configured to be connected to a tank and which is arranged and/or formed in the housing, to at least one control pressure channel, which is configured to be connected to a control pressure chamber of the pump and which is arranged and/or formed in the housing; and
    a cap filter which is arranged substantially perpendicularly to a main outer surface of the housing and formed substantially in one plane in a blind bore of the housing, wherein the at least one control pressure channel opens into a main outer surface of the housing at an angle such that the at least one control pressure channel penetrates the blind bore in a mouth region of the at least one control pressure channel adjoining the main outer surface.

2. The control valve according to claim 1, wherein an intermediate ring is inserted into the blind bore in the mouth region of the at least one control pressure channel such that the cap filter is supported mechanically relative to the housing on an inner circumference of the intermediate ring with an anti-rotation device.

3. The control valve according to claim 2, wherein an annular receiving groove configured to receive an O-ring or an R-ring, is formed using a housing groove which is introduced into the main outer surface and an intermediate ring groove which is introduced into the intermediate ring in the region of an end face of the intermediate ring and faces the housing groove so as to seal the blind bore and/or the at least one control pressure channel in the region of the main outer surface with respect to an environment.

4. The control valve according to claim 3, wherein the sealing ring rests sealingly on both a radially inner side wall of the intermediate ring groove and on a bottom surface, oriented in parallel with the main outer surface of the housing, of the intermediate ring groove.

5. The control valve according to claim 2, wherein the intermediate ring is connected to the housing under pretensioning by a press connection.

6. The control valve according to claim 2, wherein the intermediate ring is arranged countersunk in the blind bore such that a distance is formed between the main outer surface of the housing and the end face of the intermediate ring facing the main outer surface.

7. The control valve according to claim 2, wherein a receiving recess of the blind bore adjoining the main outer surface and configured to receive the intermediate ring has a greater axial length than the intermediate ring.

8. The control valve according to claim 1, further comprising:

a lever mechanism configured to be arranged in a lever recess of the housing, and configured to be movement-coupled to the valve slide to provide a feedback of a control movement of a piston of a control cylinder of the pump to the valve slide.

9. The control valve according to claim 8, wherein the lever recess penetrates the main outer surface of the housing.

10. The control valve according to claim 9, wherein an annular lever recess groove configured to receive a further sealing ring is introduced into the main outer surface of the housing, enclosing the lever recess, so as to seal the lever recess relative to an environment using a pump housing of the pump and the further sealing ring.

11. The control valve according to claim 8, wherein a plane arranged perpendicularly to the valve slide intersects both the receiving groove and at least one of the lever recess and the lever recess groove.

\* \* \* \* \*